Sept. 10, 1935.  D. A. CRAWFORD  2,014,354
VEHICLE BERTH ARRANGEMENT
Filed April 6, 1934  4 Sheets-Sheet 1
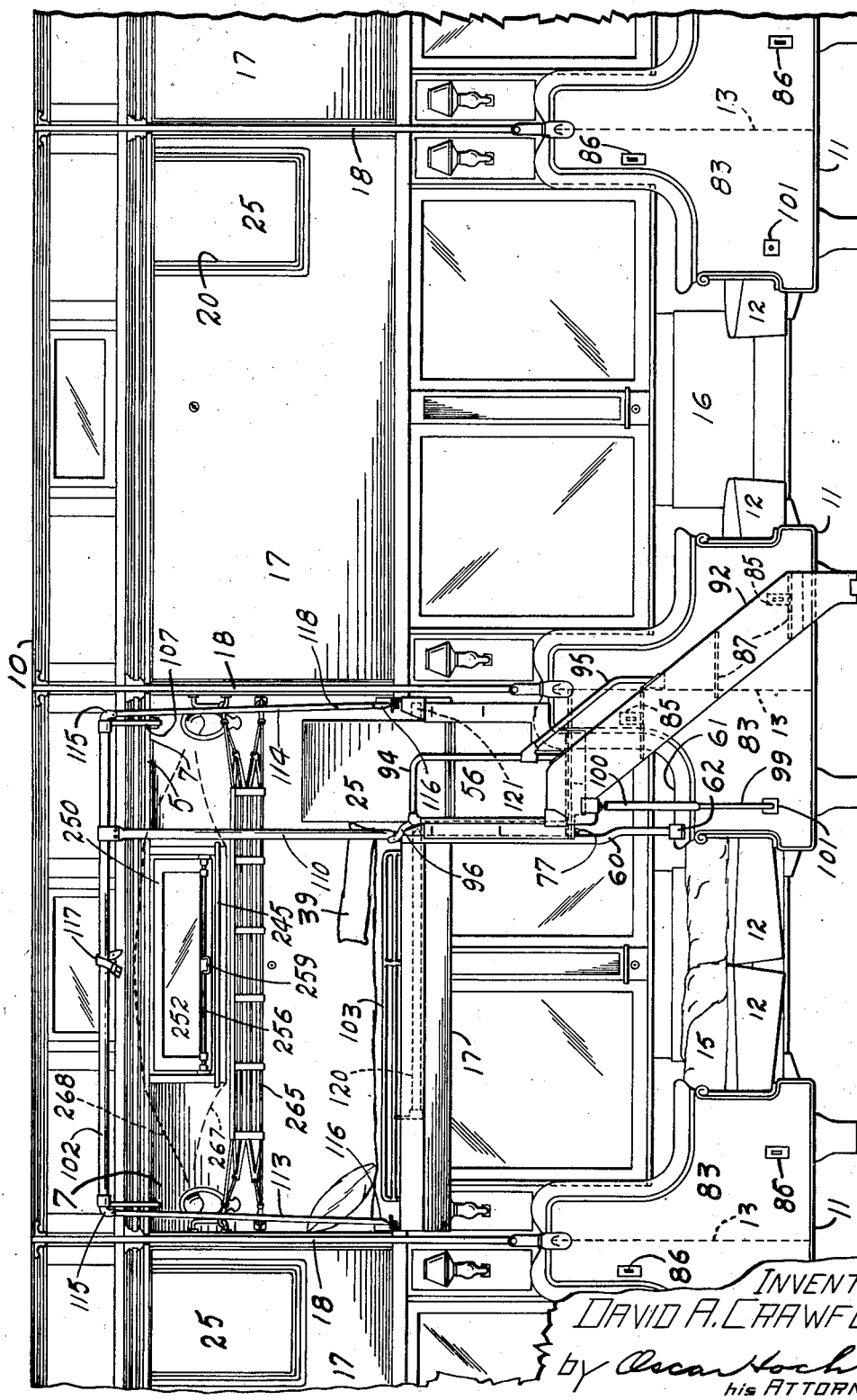
FIG.1
INVENTOR:
DAVID A. CRAWFORD.
by Oscar Hochberg.
his ATTORNEY.

Sept. 10, 1935. D. A. CRAWFORD 2,014,354
VEHICLE BERTH ARRANGEMENT
Filed April 6, 1934 4 Sheets-Sheet 2

INVENTOR:
DAVID A. CRAWFORD.
by Oscar Hochberg
his ATTORNEY.

Sept. 10, 1935.　　　D. A. CRAWFORD　　　2,014,354
VEHICLE BERTH ARRANGEMENT
Filed April 6, 1934　　4 Sheets-Sheet 3
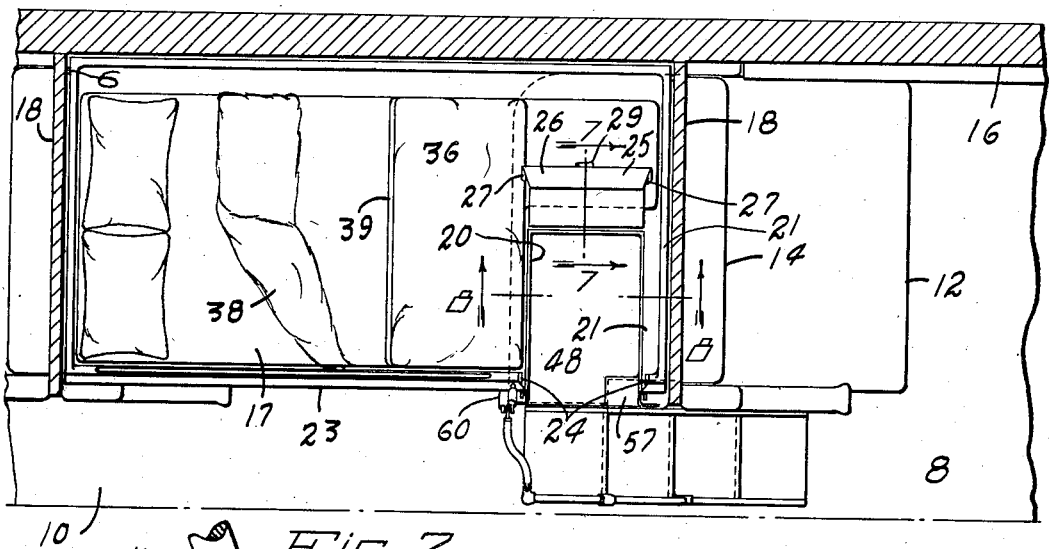
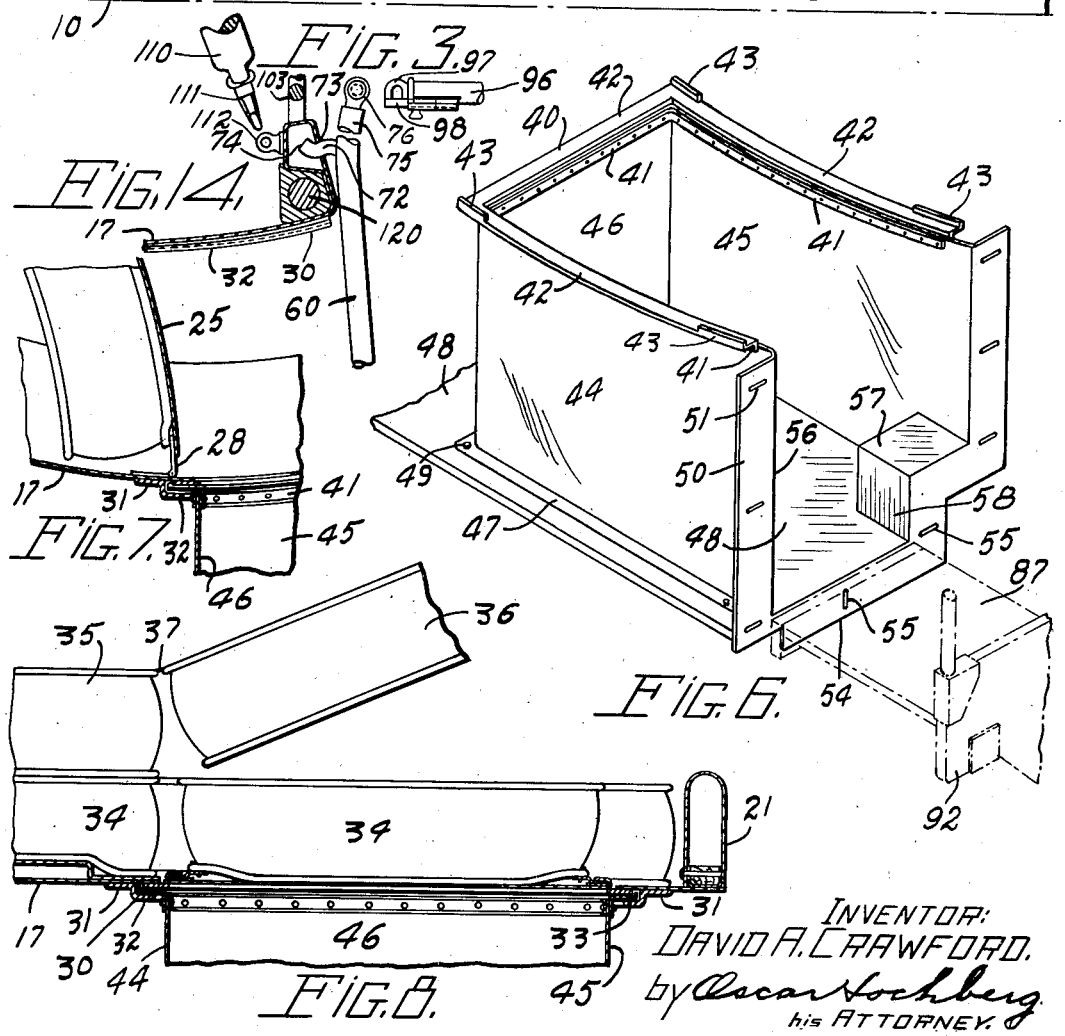

Sept. 10, 1935.  D. A. CRAWFORD  2,014,354
VEHICLE BERTH ARRANGEMENT
Filed April 6, 1934   4 Sheets-Sheet 4
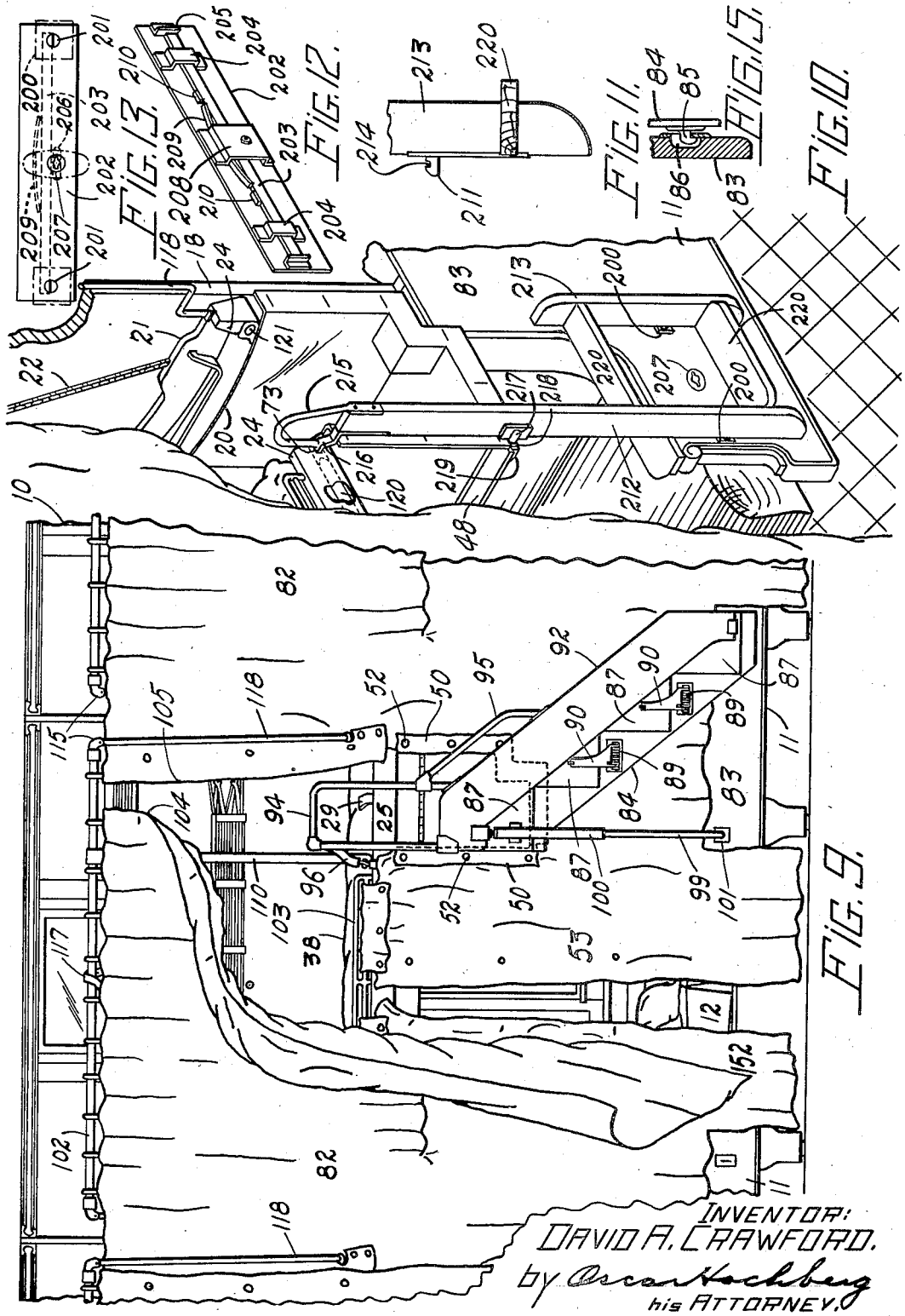
INVENTOR:
DAVID A. CRAWFORD.
by Oscar Hochberg
his ATTORNEY.

Patented Sept. 10, 1935

2,014,354

UNITED STATES PATENT OFFICE 2,014,354

VEHICLE BERTH ARRANGEMENT

David A. Crawford, Golf, Ill., assignor to The Pullman Company, a corporation of Illinois Application April 6, 1934, Serial No. 719,253

11 Claims. (Cl. 105—321)

The invention relates generally to improvements in sleeping car accommodations involving upper berth arrangements of the present standard type as embodied in berth sections adapted to be folded up out of the way for day time use and let down for occupancy during the night.

Specifically, the invention provides an upper berth assembly which affords a dressing compartment, a folding stairway for easy access to the compartment which automatically closes the entrance to the berth space after occupant has entered the compartment to insure privacy and safety from intrusion, and ample shelf space for the personal effects of the lower berth occupant.

The invention includes a dormer window arrangement for ventilation of the upper berth section under control of the occupant and for observation purposes.

The foregoing and other objects are attained by the mechanism illustrated in the accompanying drawings, in which Figure 1 is an elevational view of a berth section, upper and lower, made up for occupancy, and showing the upper berth equipped with the invention. The upper and lower berth curtains have been removed to reveal the berth interior arrangement of dressing compartment and dormer window installation. In this view also is shown a fragment of adjacent upper berth at the left of the figure, closed to illustrate the shape of the hinged door forming a portion of the bunk and the cover for the dressing compartment, and a full view of adjacent section at the right of the figure made up for day time occupancy, and showing the position of the stairway with respect to adjoining sections;

Figure 2 is a cross section thru the car showing, at the left, the relation of the dormer window to the berth, and the features with respect to the curtain bar supports offset to provide clearance for upper berth occupant when entering the dressing compartment, the supports for the curtain bar, the stairway in unfolded position, and the extended portion of the dressing compartment platform providing the shelf above noted for the use of the lower berth occupant, and at the right of the figure a similar section folded up with the upper berth closed and housing the bedding of the section, together with the stairway collapsed for stowage, and the dressing well and platform;

Figure 3 is a horizontal sectional view thru adjacent section headboards above the intermediate upper berth arrangement to show the relation of berth, dressing compartment and stairway, and depicting the mattress end turned back to expose the dressing well with the cover raised;

Figure 6 is a similar view of the fabric enclosure defining the dressing well normally suspended from its supporting frame removably held within guides in the door opening in the upper bunk when berth is made up for occupancy and showing the curtain securing flanges at the stairway and the flanged lower edge of the enclosure resting upon the platform;

Figure 7 is a vertical cross-sectional view transversely of the upper berth taken on line 7—7 of Figure 3, thru the dressing well cover raised to give access to the dressing compartment showing a portion of the securing and guide means in the door opening to receive and support the enclosure and supporting frame of Figure 6;

Figure 8 is a similar view longitudinally of the upper berth taken on line 8—8 of Figure 3, showing the dressing well cover lowered and the hinged section at the foot of the mattress indicated in position to be dropped over the well cover;

Figure 9 shows the installation with curtains in position and supported upon the curtain bar with portions thereof swept aside to reveal the relative arrangement of the lower berth curtains and to show the stairway in its collapsed position for closing the entrance to the upper berth;

Figure 10 is a modified installation of means for providing access to the upper berth;

Figure 2:
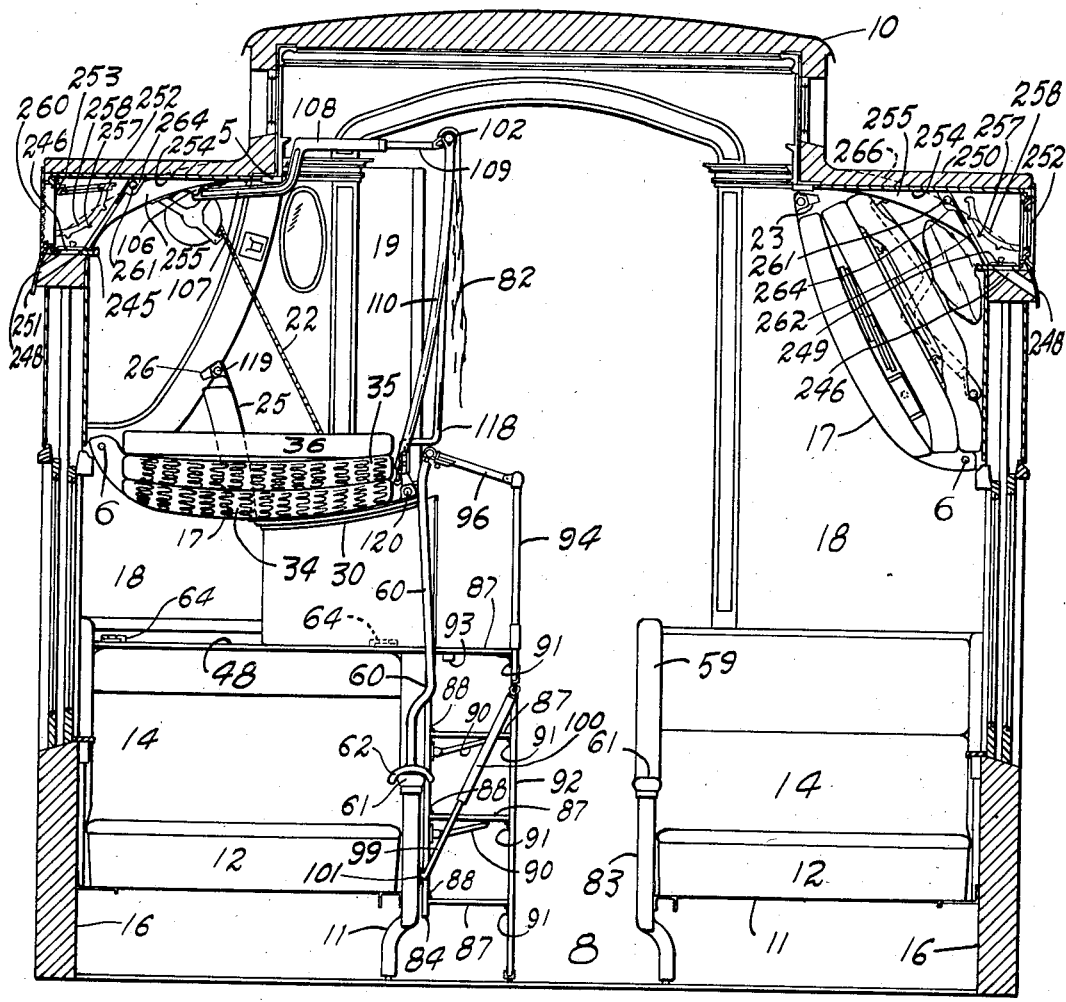

Figures 11, 12 and 13 showing complementary securing means for supporting the steps from the seat end;

Figure 14 is a view similar to Figure 7 showing the method of supporting the outer edge portion of the upper berth at the dressing well position by means of the pedestal mounted upon the adjacent underlying seat end arm rest; and Figure 15 is a detailed sectional view showing the method of removably supporting the stairway on a seat end.

In said drawings, 10 represents a sleeping car which, in the present embodiment, is equipped with seat and berth sections upon opposite sides of a central longitudinal aisle, but the invention herein may, with equal facility and advantage, be applied to such sections arranged transversely of the car with an aisle along one side of the car only. The seats 11 may be utilized for lower berth purposes in the customary manner by extending the seat cushions 12 of opposing seats away from their respective seat backs 13 and filling the spaces thus created between said cushions 12 and seat backs 13 by inserting seat back cushions 14 and providing a foundation for the usual mattress 15 and accessories.

Above the seats 11 and pivotally supported by hinges 6 from the car side 16 are upper berths 17 arranged to be lowered between pairs of headboards 18 rising from the center of respective pairs of seats. The headboards are fitted with extension pieces 19 slidably mounted upon the seat backs and secured in extended position to provide complete separation between adjoining sections when the berths have been prepared for occupancy. The construction thus far described has been in general use by the railroads throughout this country and elsewhere, but it is proposed by the invention hereinafter pointed out greatly to extend the inherent usefulness of such arrangement by the addition of facilities for the greater safety, comfort and convenience of the occupants of the section.

The improvement in its preferred form is directed to the provision of a dressing compartment for the upper berth occupant without unduly restricting the lower berth space and at the same time providing a desirable luggage shelf for the convenience of the lower berth occupant, as will presently appear. The berth 17 is cut out at its free edge transversely to a point preferably beyond the middle of the berth to provide an opening 20 of sufficient size to permit the passage of the person of the occupant. To insure stability in the berth structure about the opening, the berth end rail 21 is left undisturbed to provide a supporting connection for suspension chains 22 customarily employed for holding such berths in extended open position as best shown in Figures 2 and 10.

The longitudinal rail portions 23 at the openings 20 of the berths 17 are formed with beveled faces 24 sloping upwardly and away from the opening to insure proper seating of the door 25 formed with a rail portion 26 similarly beveled at its ends by inclined faces 27 sloped downwardly and inwardly from adjacent door edges and to facilitate raising of the door.

As best shown in Figures 3 and 7, the doors 25 are secured to the body of the berth casings by hinges 28 permitting the doors to be raised upwardly by means of a pull 29 to approximately the position indicated in Figures 2, 3 and 7. The edges of the door openings 20 are further reinforced by a frame member 30 conforming in shape to the opening and provided with attaching flanges 31 secured to the berth by welding or otherwise and formed with inwardly extending bordering flange portions 32 offset from adjacent berth portions to provide supporting rails and angular guide slots 33 for receiving the frames removably securing the walls of the dressing compartment to the berth, as shown in Figures 7 and 8.

The door 25 and the berth about the opening 20, and preferably also the surrounding area, are padded by means of a base mattress 34 or the like, upon which is laid the principal mattress 35. The foot 36 of the mattress 35 overlying the berth area at the dressing well is preferably hinged at 37 to facilitate folding back of such portion to uncover the door 25 to the dressing compartment. To prevent displacement of the blankets, sheets, etc., of the bedding 38 tucked under the mattress 35 when the berth is made up, a fabric hood 39 is slipped over the folding end 36 of the mattress.

The dressing compartment enclosure for the berth is in the form of a collapsible unit including a supporting frame portion 40 open at one of its sides and adapted slidably to connect with and be received within angular guides 33 in the door frame 30 defining the opening 20 in the berth 17, as best shown in Figures 7 and 8. As indicated in Figure 6, the frame is preferably angular in cross-section, with depending flange portion 41, to which is secured the fabric compartment enclosure, the laterally projecting supporting flange portion 42 entered within angular guide slots 33 of companion frame on the berth, and upstanding lip portions 43 at the corners of the frame to insure positive interlocking engagement between the frames.

As shown, the base and enclosure frames 31 and 40 are preferably curved to the contour of the berth so that when assembled all of the parts unite to provide a dressing compartment suspension forming virtually a part of the berth itself. The enclosure defining the dressing compartment extends downwardly on three sides to provide side walls 44 and 45 and rear wall portion 46 formed with lower marginal flanges 47 resting upon the compartment platform 48 to which they may, if necessary to prevent displacement, be detachably secured by any approved type of fastener 49. The side walls 44 and 45 at the open side of the enclosure are provided with securing flanges 50 formed preferably with buttonholes 51 to receive buttons 52 on the lower berth curtains 53, as best shown in Figures 1, 6 and 9.

They are preferably united at the platform position by a connecting flange portion 54 bridging the space beneath the adjacent edge of the platform and perforated at 55 for attachment to that portion of the curtain underlying the dressing well opening 56 defined by the enclosure walls and the platform. It will be noted that the lower corner of the dressing compartment wall 45 is deflected or offset inwardly at 57 thence downwardly at 58 to the platform 48 cut away at adjacent corner to clear the upper end of underlying wing portions 59 of the seats 11. The platform 48 is rigidly and removably secured to adjacent headboard 18 at two positions, one within compartment enclosure and the other in the shelf area beyond the compartment rear wall 46, and to a pedestal 60 firmly supported upon and rising from seat end arm 61 of the seat 11 beneath the dressing compartment to provide a three-point mounting for the platform to insure stability under the load imposed by the weight of the berth occupant upon the usable portion thereof within the compartment enclosure. As best shown in Figures 1, 2, 3, 5 and 14, the pedestal extends upwardly from its base 62 to the upper berth for interlocking engagement therewith to provide a support for the berth at the dressing compartment opening 20 as clearly shown in Figure 14.

As shown in Figure 14, the pedestal 60 at the berth rail 23 is provided with a tongue piece 72 projecting laterally from the pedestal upright portion in position to be entered in opening 73 in the side of the rail as shown, the tongue being bent upwardly at its end 74 to interlock with the berth against accidental displacement. The pedestal 60 is further extended upwardly beyond the berth and tongue connection to provide an arm 75 formed with a headed stud 76 at its upper extremity to serve as an anchorage for one end of a guard rod forming a part of the stairway assembly hereinafter outlined. At the platform position the pedestal is provided with a bracket portion 77 lipped upwardly at 78 to receive a projecting lug 79 on bracket 80 secured to the underside of adjacent corner of the platform, the bracket in the present embodiment being formed with a hook portion 81 serving to support adjacent end of the inner stile 84 of the folding stairway constituting virtually an extension of the dressing platform.

The platform and shelf extension at the edge adjacent the headboard 18 is held by hinges 63 and 64 connected by pins 65 retractably held within the hinge sockets 66 and 67 of the respective hinges. The pin 65 is held from complete withdrawal from adjacent socket 67 by means of retaining pin 68 supported in said socket and extending with its end in kerf 69 formed in the shank of the pin. To permit the pin to be retracted sufficiently to become disengaged from socket 66 of hinge 63 and farthest socket 67 of hinge 64, the kerf 69 is terminated at a point in the shank adjacent its end and extends towards the operating arm 70 at the exposed end of the pin adjacent which the kerf 69 is deflected laterally to provide an offset portion 71.

By thus supporting the platform on adjacent seat at the partition and seat end positions, the upper berths supporting the dressing compartment enclosures are relieved of the loads imposed upon the platform when used by the occupant.

Figures 4, 5:
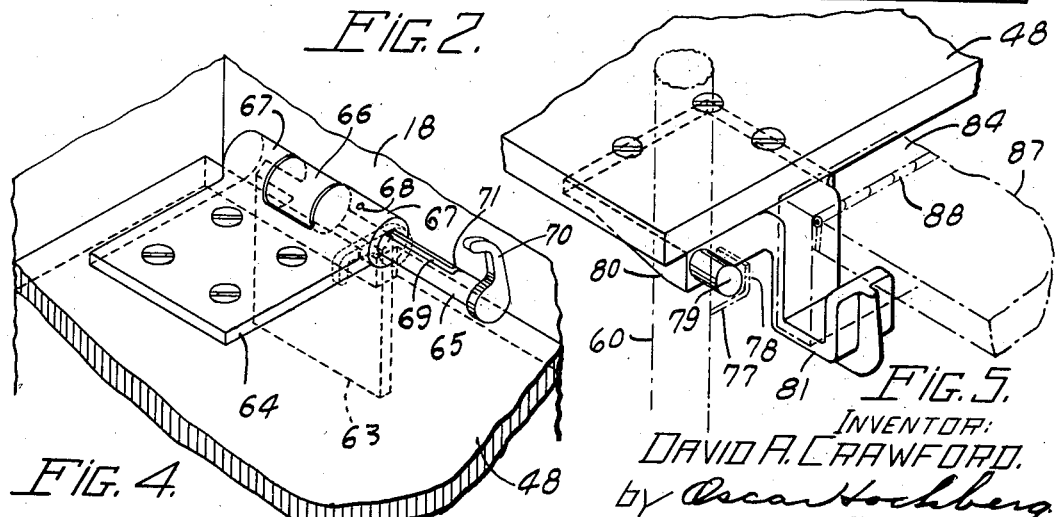
Figure 4 is a fragmentary isometric view of the car wall end extension of the dressing well platform removably secured to adjacent headboard and providing shelf space for the lower berth.
Figure 5 is a similar view of opposite end of the dressing well platform showing the method of supporting the platform at the aisle position and the means on the platform for securing the inner stile and upper tread portions of the folding stairway.

When the pin is again returned to its normal connecting position within the hinge sockets 66 and 67, it is given about a quarter turn to cause retaining pin 68 to enter the kerf offset 71 effectively to lock the pin against withdrawal, in which position the operating arm 70 will lie substantially horizontal, as indicated in broken lines in Figure 4, until it is desired again to withdraw the pin for disconnecting the hinges 63 and 64 by a reverse operating sequence. A similar hinge lock is applied to the platform and headboard adjacent the opposite end of the platform as indicated in Figures 2 and 4.

The dressing compartment is reached by means of a foldable stairway removably secured to the seat ends 83 as shown in Figures 1, 2, 3 and 9. As best shown in Figure 15, the inner stile 84 of the stairway is provided with rigid hooks 85 projecting from the stile for engagement with sockets 86 in the seat end firmly to support the stile against displacement. A suitable number of treads 87 are secured at one end to the stile by means of hinges 88 positioned to permit the treads to fold upwardly with their upper surfaces facing the stile. The inner stile 84 is also fitted with one or more spring devices 89 providing actuating arms 90 operatively engageable with the underside of adjacent treads and adapted to bear upwardly against the treads with sufficient force to urge the treads against the stile.

Upon their opposite ends the treads are secured by hinges 91 to adjacent face of an outer stile 92 to permit their respective under surfaces to face the stile when folded so that when lifted by the pressure of the spring actuated arms 90 against the treads 87, the stile 92 will be moved upwardly and toward the inner stile 84 with the treads 87 between them in the collapsed position shown in Figure 9 and there held by the pressure of the spring actuated arms 90 and out of the path of persons passing thru the aisle 8 of the car until ready to be used by the passenger to descend from or gain access to the upper berth. The springs 89 are preferably adjusted to require only a slight pressure upon the stairway to unfold it for use, but upon such pressure being removed, the stairway will automatically fold up with the outer stile 92 and upper tread 87 closing the entrance 56 to the dressing compartment. The underside of the upper tread is preferably fitted with a bumper 93 of rubber or the like to cushion the folding operation of the stairway by absorbing the force of impact delivered by the inwardly moving outer stile 92.

To facilitate unfolding of the stairway and to provide a suitable safeguard for the occupant when descending from the berth, the stairway is equipped with a guard-rail 94 projecting upwardly from the outer stile 92 to which it is firmly secured and provided with an extension rail portion 95 forming a balustrade inclined with respect to the guard-rail 94 to conform to the slope of the outer stile of the stairway as shown in Figures 1, 3 and 9. When in collapsed position, the guard-rail and outer stile provides effective protection to occupant against intrusion, and, when unfolded for use, the rail provides a convenient handhold when climbing or descending the stairway and, because of its form, it distributes the force of the loads applied to the rail over a substantial portion of the length of the stile 92.

To insure further stability in the rail against lateral pressures tending to force guard rail 94 outwardly or inwardly of the outer stile and to prevent accidental overstepping of the upper tread when ascending the stairs, an additional guard rod 96 is provided transversely of the stairway and extending from the top of the rail 94 to the upper end of pedestal extension 75 as best shown in Figure 14.

The guard rod is fitted at its inner end with a hook 97 opening downwardly so as to fit over the shank of stud 76 on the pedestal extension and locked in position by the bolt 98 on the rod slidable to close the hook opening to prevent disengagement of the rod and pedestal as will be evident from an inspection of Figure 14. Further to support the stairway under the loads imposed to preserve its proper balance when in use, the upper end of the outer stile adjacent the upper tread 87 is braced by a strut element extending downwardly and inwardly from the stile to adjacent seat end 83 to which it is detachably secured. The strut is extensible with a lower section 99 in the form of a rod telescopically engaging an upper tubular section 100.

The upper section is movably anchored at its upper end to the stile 92 and the lower section is removably anchored at its lower end to the seat end by means of a hook engageable with a socket plate 101 in the seat end substantially as indicated in Figure 15 except that the hook forms part of the strut rod 99. As the stairway moves towards its collapsed position against the berth and seat end, the strut parts will be extended to accommodate themselves to the resulting increase in the length of the strut, and upon unfolding of the stairway the strut length will be reduced to a predetermined minimum, at which point the parts will have reached their limit of movement to function as a support for the opened stairway, as described.

It will be noted that the berth curtains 82 for the upper berth extend downwardly from supporting rod 102 to overlap the lower berth curtains 152 suspended from rods 103 on upper berth rail 23 as in customary practice except that the upper berth curtains open at the dressing compartment opening 56 with the edge 104 of one curtain being adapted for fastening to contiguous edge 105 of adjacent curtain 82 of adjoining berth section, as best shown in Figure 9. The lower berth curtains 152 are cut out at the dressing compartment opening 56 and are also divided at approximately the center of the section sufficiently removed from the stairway to avoid any restriction of movement on the part of the lower berth occupant, since the stairway parts are well within the limits of the outer extremities of the respective seat ends and therefore do not obtrude themselves upon the lower berth accommodations.

For the further convenience and security of the upper berth occupant, the curtain supporting rods 102 are supported to clear the head of the occupant when standing upon the platform 48 of the dressing compartment and when entering or leaving the berth. This is accomplished by offsetting the supporting arms 107 pivotally secured by pivots 106 to the roof 7 of the car above the upper berth. The arms are bent to provide, when raised, portions 108 in a plane substantially above their pivots 106 and designed for telescopic connection with extensions 109 securing the curtain rods 102 as shown in Figures 1 and 2.

With the arm extensions 109 projected for service, the rods 102 are positioned outwardly beyond the berth lines to allow the curtains 82 to drape over the stairway when collapsed and to permit the edges 104 and 105 of adjoining berth curtains to be buttoned together without unduly straining them.

The arms 107 are normally held in their raised position at points beyond their respective pivots 106 by latches concealed in apron 5 above the berth as in established practice, to support the curtain rods 102 and curtains 82. In the present embodiment, a flexible guard cable 110 is suspended from the curtain rod 102 at one side of the opening 56 to the dressing compartment and provided at its lower end with a hook 111 adapted for engagement with the eye piece 112 on rail 23 of the upper berth 17 as best shown in Figure 14. The cable serves also as a grab for the occupant when moving into or out of the dressing compartment and when raising or lowering the compartment door 25.

The use of the guard cable exerts substantial strain upon the curtain rod 102, therefore additional supports are provided to insure ample stability thereof under the increased load thus imposed. These supports preferably are in the form of rods 113 and 114 pivotally secured to the curtain rod at its ends by hinges 115 arranged with their axes transversely of the curtain rod so as to swing in a plane longitudinally of said rod. When in use, the supporting rods are releasably secured at their free ends 116 to respectively adjacent berth ends as shown in Figures 1, 9 and 10. When collapsed, these rods are held beneath curtain rod 102 by strap 117 releasably supporting their respective ends and, with the guard cable 110, are movable with the curtain rod 102 supporting them.

For the further convenience of the upper berth occupant, the supporting rod 114 at the berth end rail side of opening 56 is offset outwardly from its free end 116 to provide a grab handle portion 118 projecting preferably outwardly of the plane of the edge of adjacent partition 19 as shown in Figure 9 to provide sufficient clearance for the hand of the user. When the berths are to be closed, the retractile arm extensions 109 will be slid into collapsed position within the tubular arms 108 in order to clear the berth 17 when swung downwardly about their pivots 106 to assume a folded position within the berth as indicated in broken lines to the right of Figure 2 without interfering with the stowage of bedding, stairway, dressing compartment enclosure and platform within the berth when closed.

The doors 25 hinged to the berths are locked before the berths are closed to prevent them from moving away from their respective openings when the berths have been raised. For this purpose, locking bolts 120 are slidably mounted in the rail 23 of the berth, portions of which are broken away to expose the bolt in Figure 10. Figure 1 shows the bolt housed within the rail and indicated in broken lines in position with its end adjacent sloping face 24 at the door opening and movable when the door 25 is closed to extend thru opening 119 in the door rail 26 and into opening 121 in sloping face portion 24 on end rail 21, best shown in Figure 10.

An alternative form of means for reaching the dressing compartment may involve the use of a fixed tread step of the type indicated in Figure 10. As in the case of the foldable stairway of the first embodiment, this step is detachably secured to and supported from a seat 11. In the installation of this type of step, it is desirable that the seat ends be fitted with suitable step locking means operable by the attendant with key to release the step but locking the step automatically when step has been mounted in position on the seat end, as will presently appear.

The seat end is fitted with socket plates 200 registering with openings 201 in lock plate 202 secured to the rear face of the seat end panel 83. The lock plate is fitted with a locking bar 203 movable vertically in keepers 204 between guide clips 205 at the end of the bar. The locking bar 203 is raised by means of an arm piece 206 engaging the underside of the bar and actuated by a key insertable in latch piece 207 in keeper 208. A strip spring 209 bearing at its ends upon the upper side of locking bar 203 held by abutment shoulders 210 on the bar, and bearing upwardly against keeper housing 208, operates to exert a resilient pressure downwardly upon the locking bar to hold said bar in position partially to overlap the openings 201 in lock plate 200 so that the lower portion of such openings will be left unobstructed to receive hooks 211 projecting from and rigidly secured to the stile 212 and the relatively shorter stile 213, as best shown in Figures 10 and 11.

The hooks 211 are open at their upper sides so that when inserted in socket plates and openings 201 the nose portions of the hooks will move beneath the ends of the locking bar 203 to lift it to admit the full depth of the hook until the recess 214 in the hook registers with the bar when the bar under pressure of spring 209 will drop into the hook recesses automatically and positively to engage the hooks to prevent removal of the step until unlocked by the attendant in the manner and by the means outlined.

In the form of step indicated, the longer stile 212 is extended upwardly to the upper berth 17 and is equipped with a handhold 215 surmounting the stile for convenience in reaching the dressing compartment platform 48. The stile adjacent the berth rail 23 and preferably forming part of the handhold fitting 215, is provided with a lug piece 216 similar to tongue piece 72 of the pedestal shown in Figure 14, and entered in opening 73 in the berth rail to support the berth. Said stile at the platform position is also fitted with a socket piece 217 adapted to receive a projecting lug 218 on bracket 219 secured to adjacent corner of the platform 48 of the dressing compartment thereby firmly to support the platform at that point. In the particular type shown, the treads 220 of the step are connected rigidly to the stiles, but, as will be obvious, the treads may be hinged to the stiles as in the first embodiment to allow the steps to be collapsed for storage when removed, or the steps may assume other forms within the spirit of the invention.

Ventilation of the upper berth section under the control of the occupant is also provided. In the form selected for the present embodiment of the invention, the roof 7 of the car at the several upper berth positions is pierced by dormers 250 projecting outwardly from a predetermined point on the roof to the car side and substantially flush with the roof at the eaves 251 to permit the installation of a window 252 at that position so that such window, when pivoted to the dormer at its upper edge, may be swung inwardly to full open position as shown at the left of Figure 2 without undue projection into the berth space.

The window sash is hung by hinges 253 secured to the upper edge thereof and to the dormer roof 254 within dormer opening 255. The windows are fitted with latch rods 256 rotatably mounted thereon and formed at their opposite ends with catches adapted to engage the teeth 257 of the rack segments 258 on the dormer sides to regulate the opening of the sash and thereby control the ventilation of the berth space. The latch rods are manipulated by a handle 259 conveniently formed on the latch rod and grasped to lift the window. The window sill 245 is formed with a ventilating opening 246 communicating with an opening 247 at the eaves 248 of the roof and controlled by a ventilating register 249 slidably mounted on the sill to provide for a smaller quantity of air than that obtainable by opening the window.

The window is also fitted with a screen 260 positioned outside the sash to prevent the entry of dirt and cinders into the berth space. Suitable curtains 261 may also be mounted in guides 262 sloping from the inner edge of window sill 245 to the curtain box 264 in the dormer roof to shade the light from the window or protect the occupant from abnormal drafts of air should the window be left widely open. It will be noted that the dormer window is of substantial length extending from a point approximating the edge of the dressing compartment towards the opposite headboard 18 and above the position of the fabric shelf 265 extending from headboard to headboard of each section.

It will be evident from an inspection of Figures 1 and 2, that the dormer type of window lends itself to cars having streamlined contours now generally adopted for high-speed trains. In the embodiment herein, the dormer roofs 254 at their sides merge into the curved roof 7 of the car as indicated by the dotted outline 266 of the dormer roof in Figure 2.

The sides of the dormer from the window at the car side extend rearwardly and laterally from the corners of the dormer with curved faces diminishing progressively in height as indicated diagrammatically by dotted lines 267 and 268 defining, respectively, the upper and lower edges of said walls until they merge into the curved roof surface so as to present the least possible obstruction to the wind.

What I claim is:

1. In a vehicle berth arrangement including a pivoted upper berth section foldable against the vehicle wall, a pair of opposing seats beneath said upper berth section convertible to provide a lower berth, an enclosure carried by said upper berth forming a dressing compartment at the end of said section, a platform for said compartment supported from said seats and extending beyond said enclosure to provide shelf space in said lower section, and means for gaining access to said compartment.

2. A vehicle berth arrangement including a pivoted upper berth section foldable against the vehicle wall, a pair of opposing seats beneath said upper berth section convertible to provide a lower berth, an enclosure suspended from said upper berth at the end of the section defining a dressing compartment, a platform for said compartment secured to the enclosure and supported from said seats, and removable step means for gaining access to said platform.

3. A vehicle berth arrangement including a pivoted upper berth section foldable against the vehicle wall and provided with an opening extending transversely thereof and a door for closing said opening adjacent one end of said section, a frame defining said opening and providing guideways, a separate frame slidably supported within said guideways, a collapsible enclosure secured to said second frame and defining dressing compartment walls suspended from said frame, a platform secured to said enclosure to provide a floor for said compartment, and a removable stairway extending downwardly from said platform.

4. In a vehicle berth arrangement comprising upper berth sections foldable against the vehicle wall, pairs of opposing seats beneath said berths convertible to provide lower berth sections, partitions extending transversely between the sections and secured to said wall, enclosures carried by said upper berths adjacent said partitions to provide dressing compartments for said upper berths, platforms carried by said seats and partitions secured to said compartment enclosures, and a stairway removably supported from said seats and foldable against said sections to prevent access to said platforms.

5. In vehicle berth arrangements including upper and lower berth sections arranged on one side of a longitudinal aisle, enclosures providing dressing compartments suspended from said upper berths and opening to said aisle, partitions extending transversely between adjoining sections, platforms for said compartments secured to said partitions and enclosures, and removable stairways foldable automatically to close the openings to said compartments.

6. In vehicle berth arrangements including upper and lower berth sections arranged on one side of a longitudinal aisle, enclosures providing dressing compartments suspended from said upper berths and opening to said aisle, partitions extending transversely between adjoining sections, platforms for said compartments secured to said enclosures and partitions, and removable stairways supported upon the lower section and foldable automatically to close the openings to said compartments.

7. A vehicle berth arrangement including a pivoted upper berth section foldable against the vehicle wall, a pair of opposing seats beneath said upper berth section convertible to provide a lower berth, an enclosure suspended from said upper berth defining a dressing compartment at one end thereof having an access opening, a platform for said compartment supported from said lower berth section, and a removable stairway foldable automatically to close said compartment opening.

8. In a vehicle berth arrangement having upper berth sections provided with dressing compartments extending below the berths and opening to the car interior, removable stairways foldable to close said openings, curtains associated with said berths, rods supporting said curtains, partitions extending transversely of and separating the berths of adjoining sections, supporting arms pivotally mounted above said berths and formed with collapsible sections extensible to support the curtains outwardly of the berth sections, and strut rods connecting said berths and curtain rods, certain of said strut rods being shaped to provide hand holds at the compartment openings.

9. In a vehicle berth arrangement including a pair of opposing seats convertible to provide a lower berth section, partitions supported from said seats and extending above the seating space of adjacent berth sections dividing adjacent berths, a pivoted upper berth section foldable against the vehicle wall in combination comprising a pair of arms removably mounted above said berths and adjacent said partitions supporting a platform detachably supported from said lower berth section, a partition depending from said upper berth section and removably engageable at its lower end with said platform providing a dressing compartment for said berth, an opening in said partition giving access to said compartment, a door forming a portion of said partition for closing said opening and a stairway removably supported upon said lower berth section and foldable automatically to close said compartment.

10. In a vehicle berth arrangement including upper and lower berth sections, dressing compartments extending below said upper berths comprising enclosing walls suspended from the upper berths and platforms detachably supported from said seats and engageable with said walls, and collapsible stairways associated therewith, the combination comprising inner stile members detachably supported in adjacent seat ends, tread members hinged to said stiles with their free ends movable upwardly toward the plane of the stiles, the uppermost of said treads constituting outward extensions of said platforms, outer stile members hinged to the free ends of the respective treads, guard rails surmounting said outer stiles extending above said upper treads, and spring means on the inner stiles operatively engaging the undersides of respectively adjacent treads to force them upwardly against said stiles to raise the outer stiles and respective guard rails to overlap said compartments.

11. In a vehicle berth arrangement including upper and lower berth sections, dressing compartments extending below said upper berths comprising enclosing walls suspended from the upper berths and platforms detachably supported from said seats and engageable with said walls, and collapsible stairways associated therewith, the combination comprising inner stile members detachably supported in adjacent seat ends, tread members hinged to said stiles with their free ends movable upwardly toward the plane of the stiles, the uppermost of said treads constituting outward extensions of said platforms, outer stile members hinged to the free ends of the respective treads, and guard rails surmounting said outer stiles extending above said upper treads, and spring means on the inner stiles engageable with said treads to force them upwardly against said stiles to cause said outer stiles and respective guard rails to overlap said compartments.

DAVID CRAWFORD.